(12) United States Patent
Ishizaki

(10) Patent No.: US 7,366,784 B2
(45) Date of Patent: Apr. 29, 2008

(54) SYSTEM AND METHOD FOR PROVIDING AND USING A VLAN-AWARE STORAGE DEVICE

(75) Inventor: Takeshi Ishizaki, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 712 days.

(21) Appl. No.: 09/996,308

(22) Filed: Nov. 27, 2001

(65) Prior Publication Data

US 2003/0101239 A1   May 29, 2003

(51) Int. Cl.
*G06F 15/16* (2006.01)
(52) U.S. Cl. ............... 709/228; 709/223; 711/167; 711/114
(58) Field of Classification Search ........... 709/228, 709/238, 223, 219; 370/389, 401, 218; 711/167, 711/114
See application file for complete search history.

(56) References Cited

U.S. PATENT DOCUMENTS

| | | | |
|---|---|---|---|
| 5,751,967 A * | 5/1998 | Raab et al. ........... | 709/228 |
| 5,935,249 A | 8/1999 | Stern et al. | |
| 6,061,334 A | 5/2000 | Berlovitch et al. | |
| 6,085,238 A | 7/2000 | Yuasa et al. | |
| 6,131,121 A | 10/2000 | Mattaway et al. | |
| 6,151,326 A | 11/2000 | McGuire et al. | |
| 6,167,445 A | 12/2000 | Gai et al. | |
| 6,188,691 B1 | 2/2001 | Barkai et al. | |
| 6,189,041 B1 | 2/2001 | Cox et al. | |
| 6,223,218 B1 | 4/2001 | Iijima et al. | |
| 6,229,787 B1 * | 5/2001 | Byrne ........... | 370/218 |
| 6,269,076 B1 | 7/2001 | Shamir et al. | |
| 6,308,218 B1 * | 10/2001 | Vasa ........... | 709/238 |
| 6,389,432 B1 * | 5/2002 | Pothapragada et al. ...... | 707/205 |
| 6,434,156 B1 * | 8/2002 | Yeh ........... | 370/401 |
| 6,490,618 B1 * | 12/2002 | Ferguson et al. ........... | 709/223 |
| 6,529,997 B1 * | 3/2003 | Debiez et al. ........... | 711/114 |
| 6,597,956 B1 * | 7/2003 | Aziz et al. ........... | 700/3 |
| 6,651,096 B1 * | 11/2003 | Gai et al. ........... | 709/223 |
| 6,735,679 B1 * | 5/2004 | Herbst et al. ........... | 711/167 |
| 6,735,765 B1 * | 5/2004 | Schumacher ........... | 717/164 |

(Continued)

FOREIGN PATENT DOCUMENTS

JP    2000341327    8/2000

(Continued)

OTHER PUBLICATIONS

Kent, S. and R. Atkinson; "Security Architecture for the Internet Protocol"; Network Working Group, dated Nov. 1998, 58 pages; RFC 2401; Copyright—The Internet Society (1998). URL: http://www.ietf.org/rfc/rfc2401.txt?number=2401.

(Continued)

*Primary Examiner*—William Vaughn
*Assistant Examiner*—Thanh T. Nguyen
(74) *Attorney, Agent, or Firm*—Sughrue Mion PLLC

(57) ABSTRACT

The present invention provides secure IP protocol capable storage devices using Virtual Local Area Network (VLAN) techniques. Specific embodiments of the present invention provide techniques for securing VLAN aware storage devices, and the like. In specific embodiments, techniques according to the present invention can provide Internet data centers that are responsible for keeping their customer's computers and storages safe and secure with the capability to strictly separate LAN access for different customers using VLAN (virtual LAN) technology.

30 Claims, 16 Drawing Sheets

System configuration

U.S. PATENT DOCUMENTS 6,788,681 B1 * 9/2004 Hurren et al. .............. 370/389
2001/0020273 A1 9/2001 Murakawa

FOREIGN PATENT DOCUMENTS

JP 2001160828 12/2001

OTHER PUBLICATIONS

"IEEE Standards for Local and Metropolitan Area Networks: Virtual Bridged Local Area Networks"; IEEE Std 802.1Q-1998; Sponsor: LAN MAN Standards Committee of the IEEE Computer Society; Approved Dec. 8, 1998; 211 pages; Copyright—1999 Institute of Electrical and Electronics Engineers, Inc.; ISBN 0-7381-1538-X SS 94709. URL: http://standards.ieee.org/reading/ieee/std/lanman/802.1Q-1998.pdf.

Satran, Julian, et al.; "iSCSI"; IPS Internet Draft; Jul. 20, 2001; 160 pages; category: standards-track. URL: http://www.ietf.org/internet-drafts/draft-ietf-ips-iscsi-07.txt).

Gibbons, Kevin, et al.; "iSNS Internet Storage Name Service"; Internet Draft; Jun. 2001; 69 pages. URL: http://www.ietf.org/internet-drafts/draft-ietf-ips-isns-04.txt).

* cited by examiner

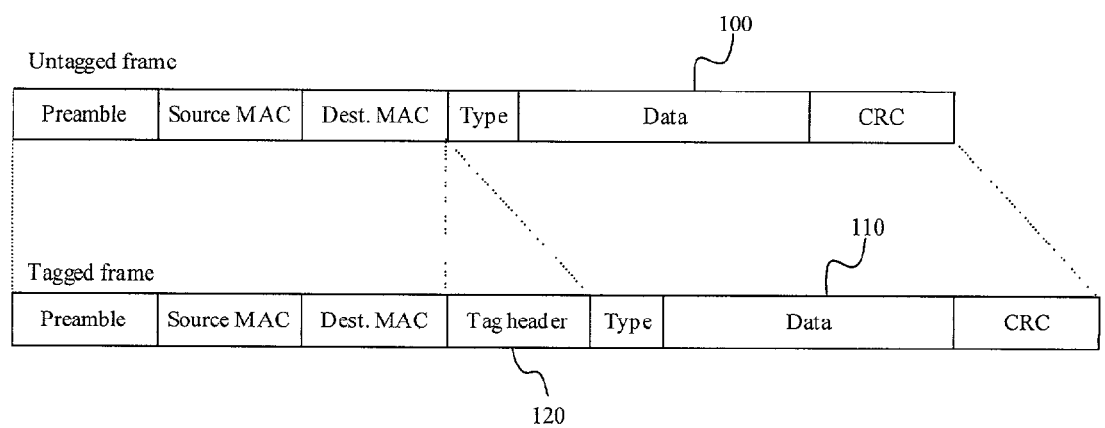
Fig. 1 Tagged frame and untagged frame

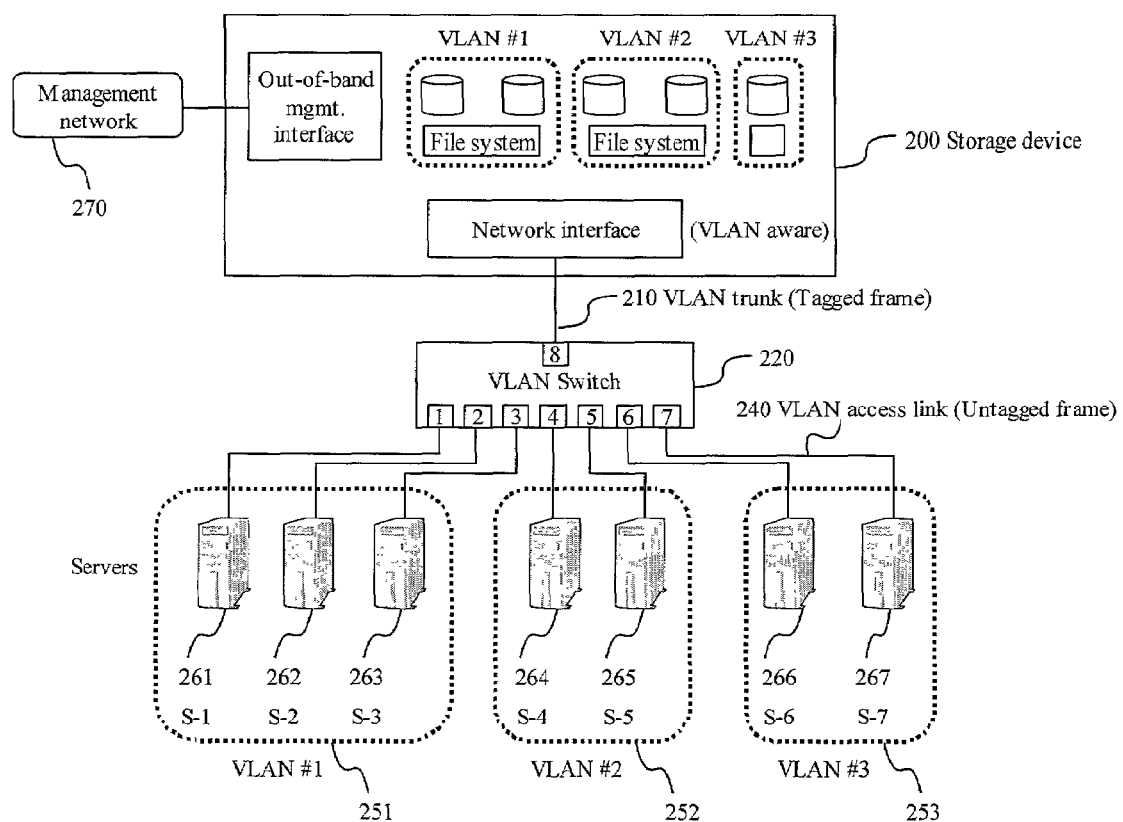
Fig. 2 System configuration

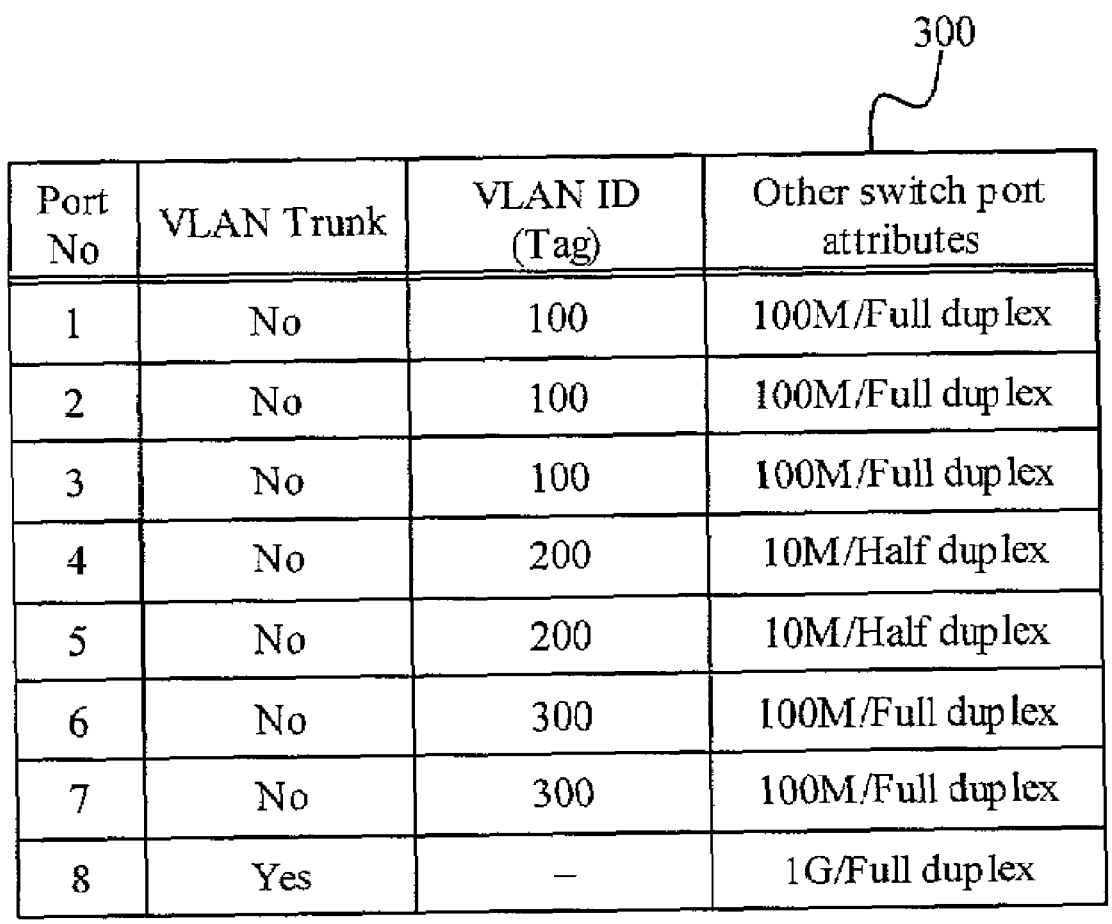
Fig. 3 Port-based VLAN switch configuration

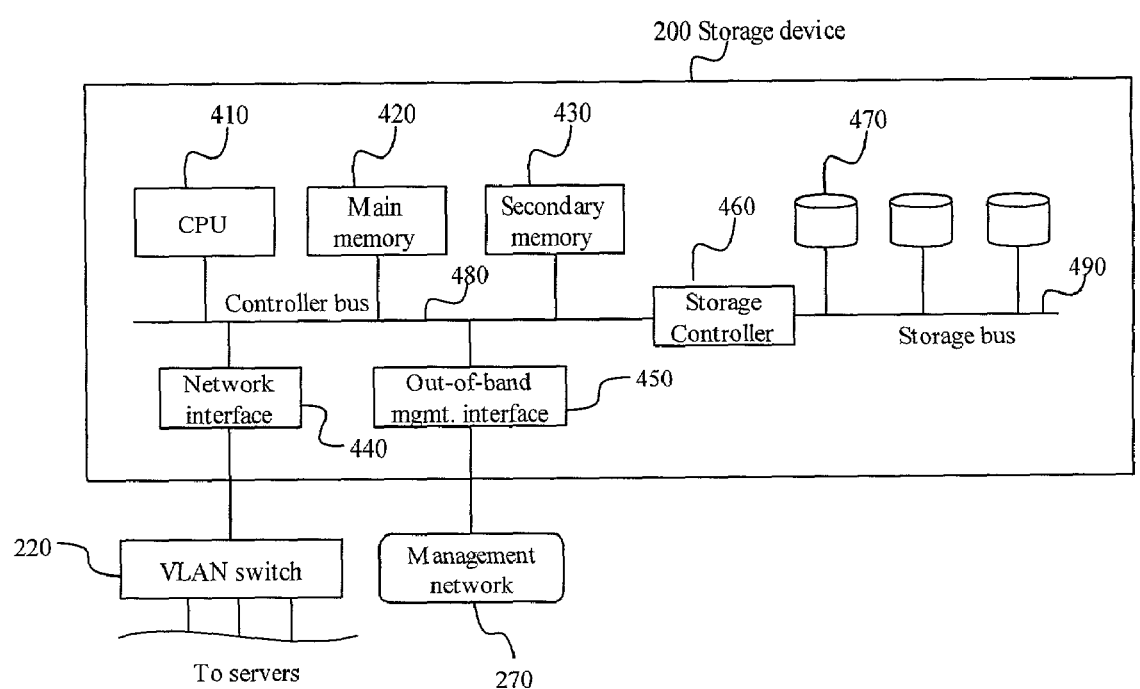
Fig. 4 Hardware configuration

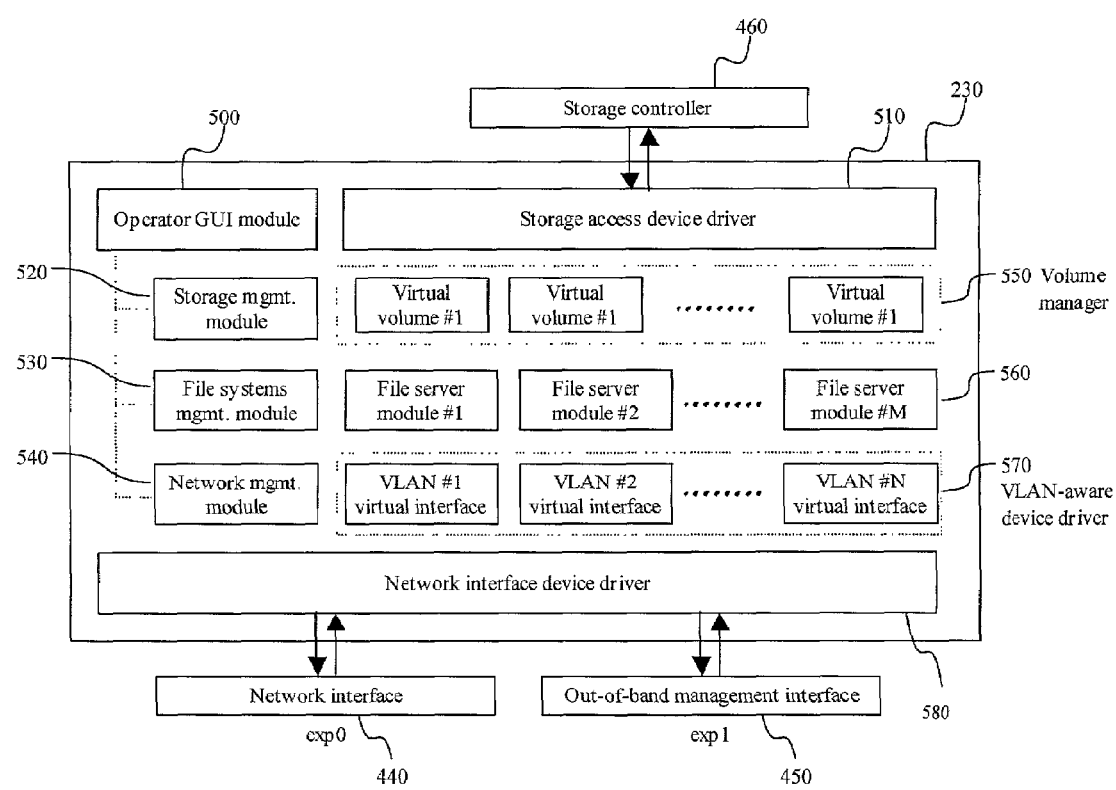
Fig. 5 Software modules

| Interface no. | Interface name | Physical interface name | VLAN ID (Tag) | IP address | Maximum throughput | Management |
|---|---|---|---|---|---|---|
| 1 | vlan1 | exp0 | 100 | 10.0.1.1/24 | 50Mbps | No |
| 2 | vlan2 | exp0 | 200 | 10.0.2.1/24 | 5Mbps | No |
| 3 | vlan3 | exp0 | 300 | 10.0.3.1/24 | 10Mbps | No |
| 4 | exp0 | exp0 | – | 10.0.4.1/24 | 10Mbps | No |
| 5 | exp1 | exp1 | – | 192.168.1.1/24 | 10Mbps | Yes |
Fig. 6 Network interface configuration table

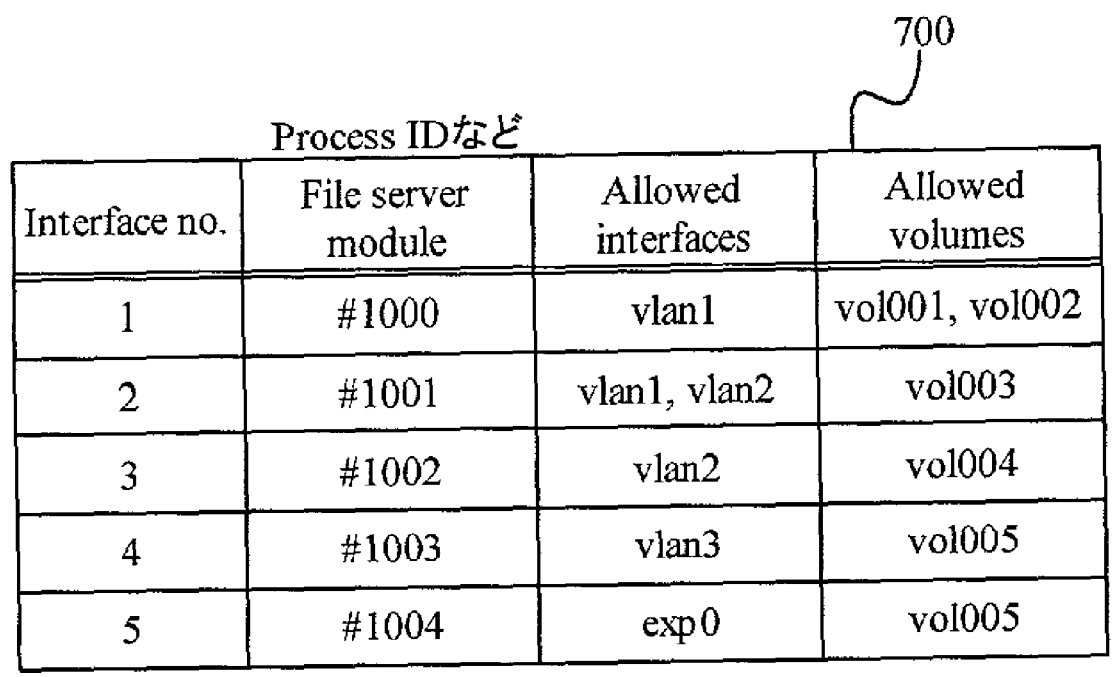
Fig. 7 File system configuration table

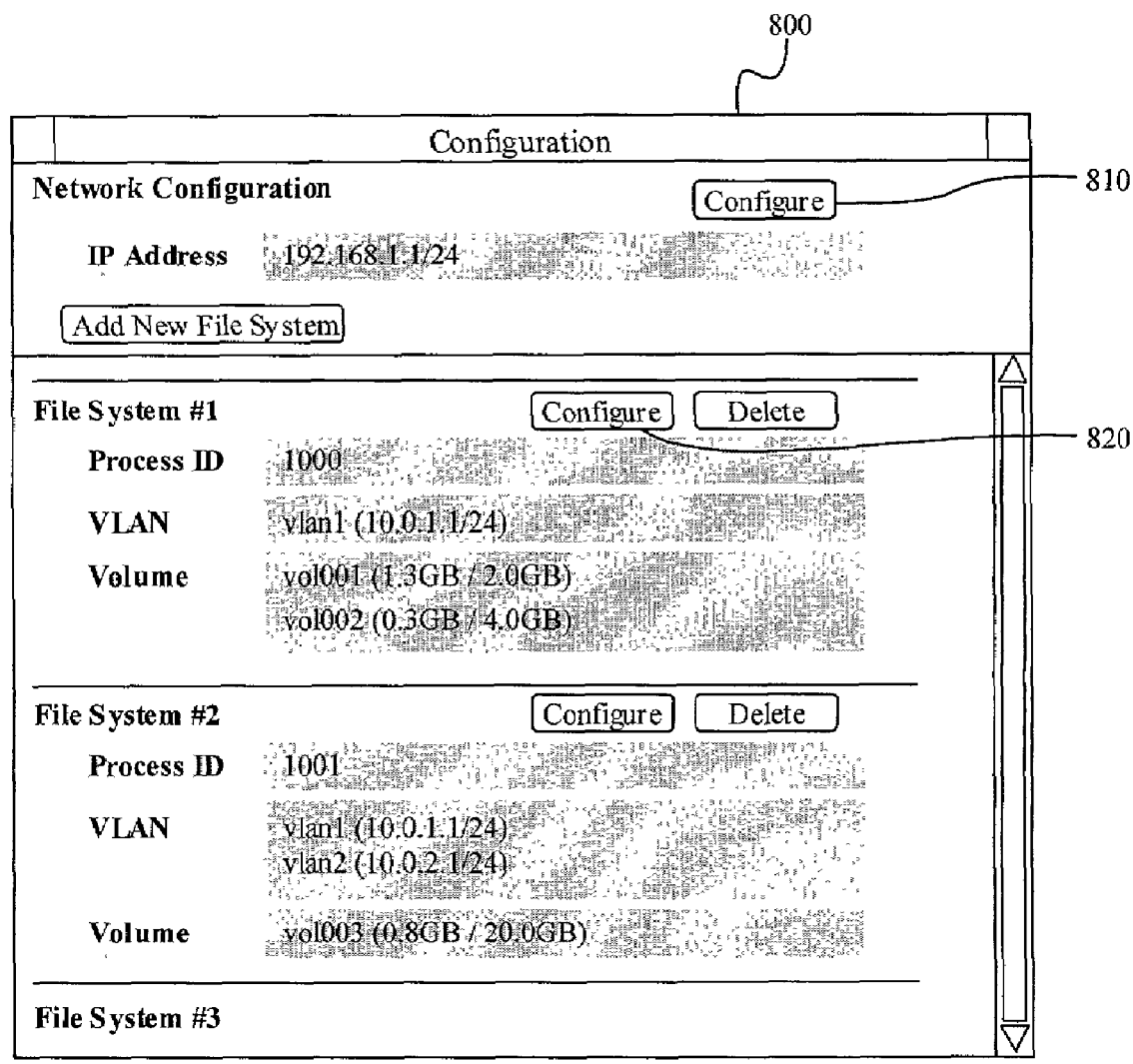
Fig. 8 System configuration window

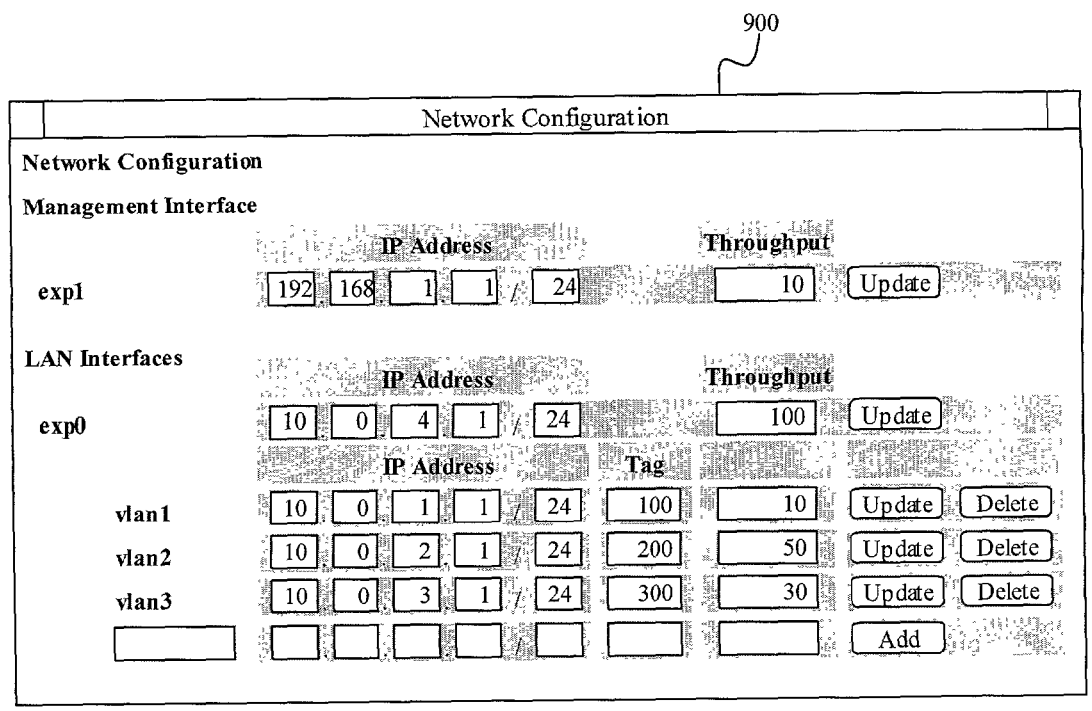
Fig. 9 Network configuration window

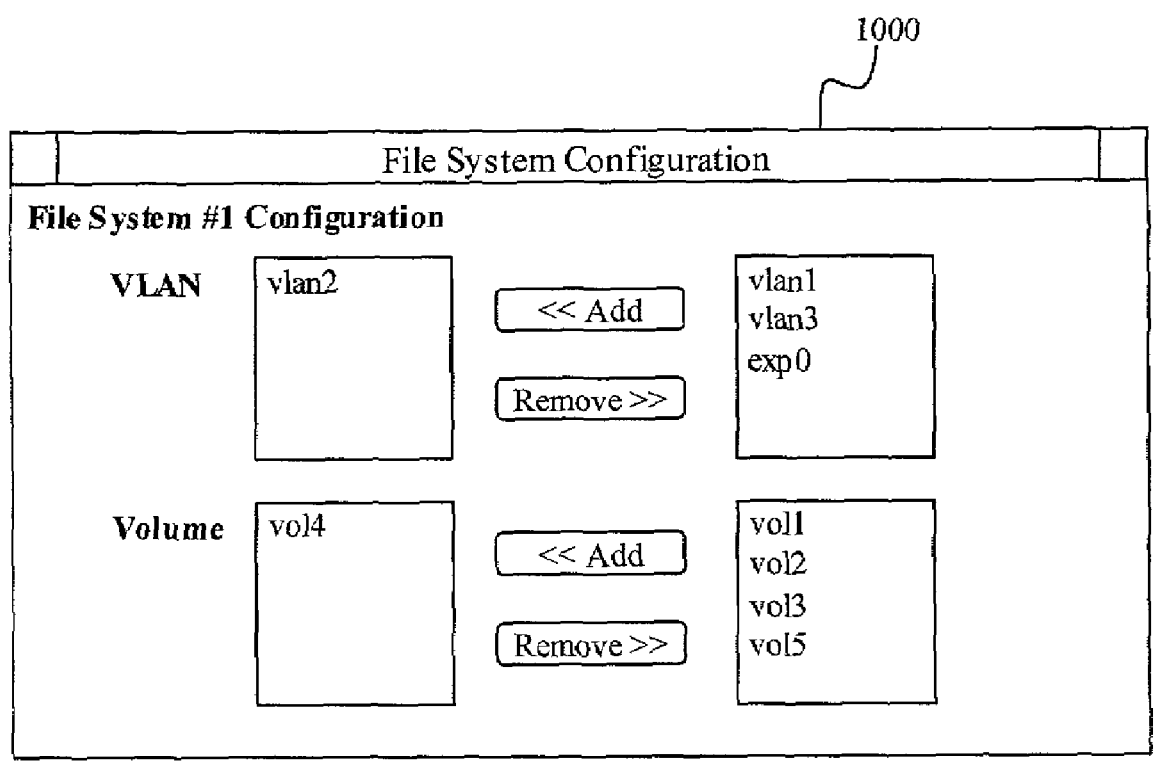
Fig. 10 File system configuration window

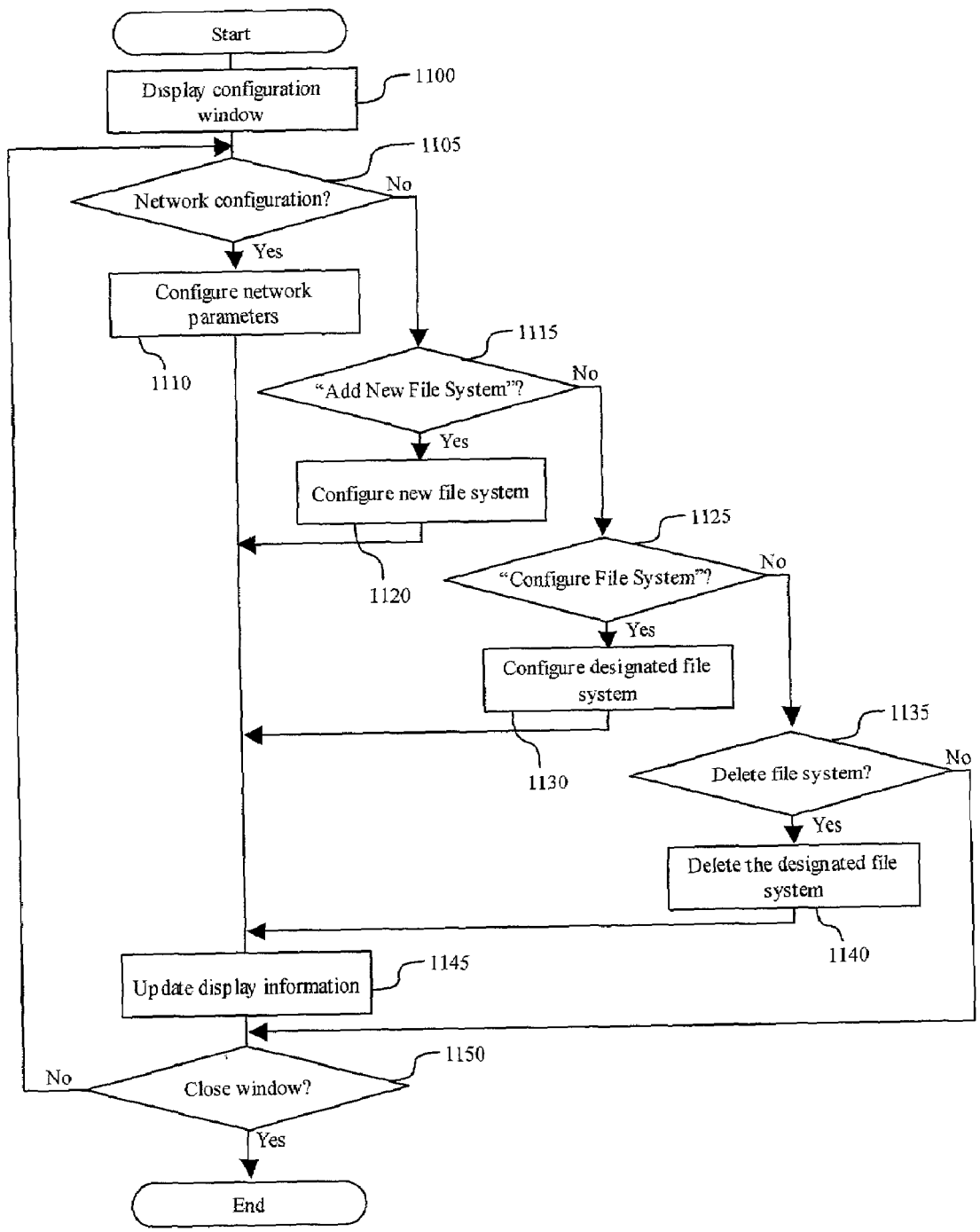
Fig. 11 Flowchart of system configuration

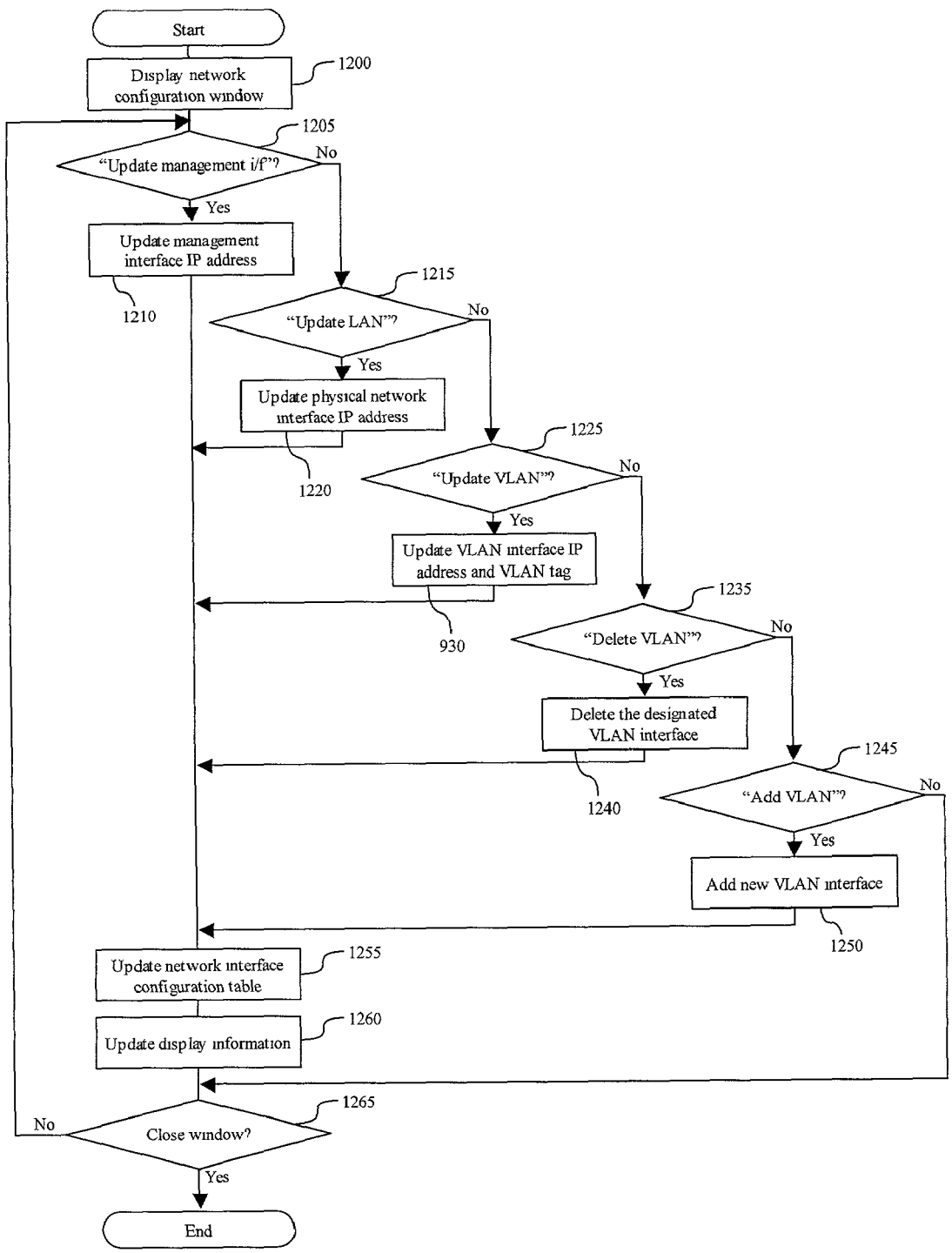
Fig. 12 Flowchart of network configuration

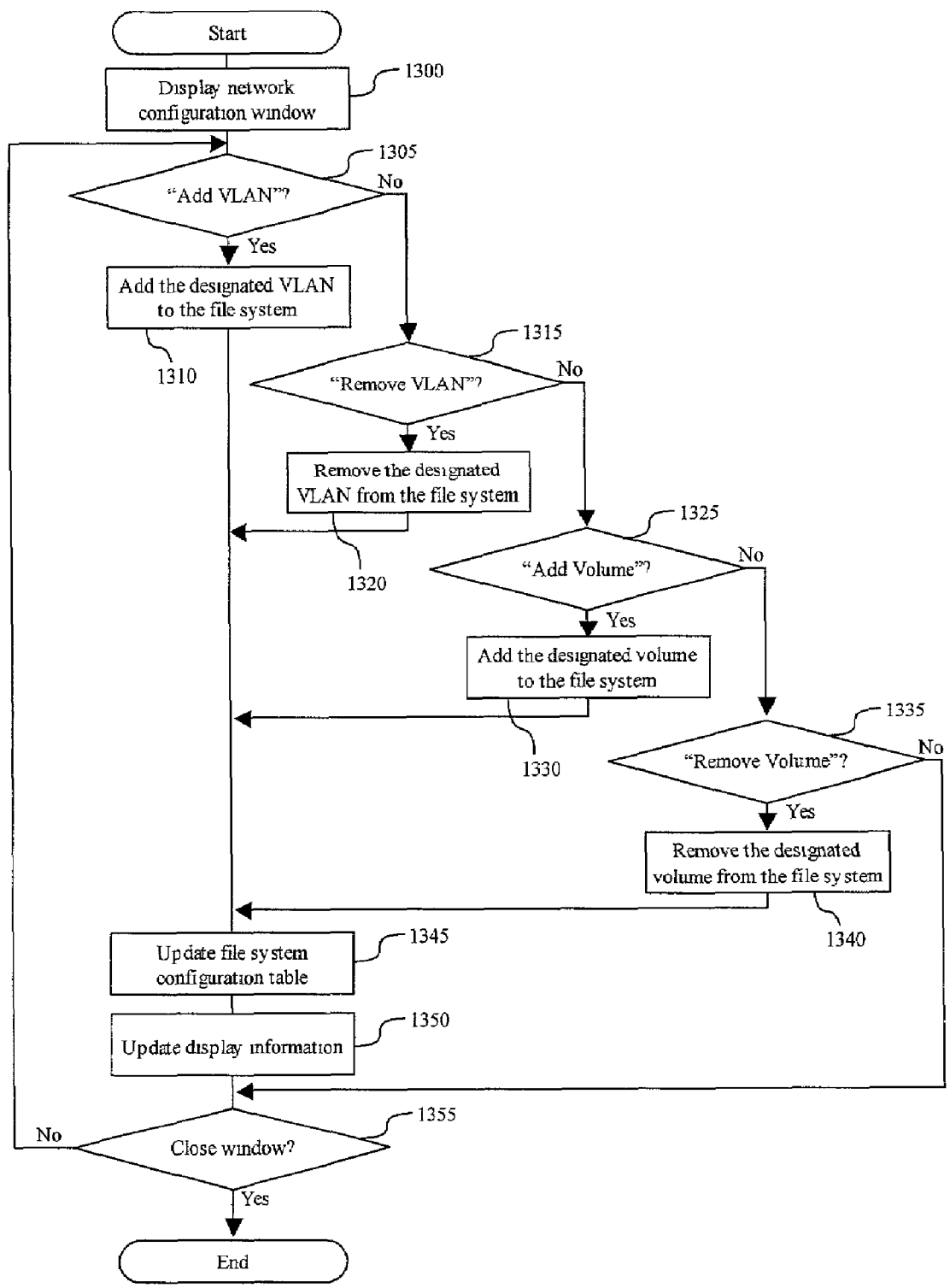
Fig. 13 Flowchart of file system configuration

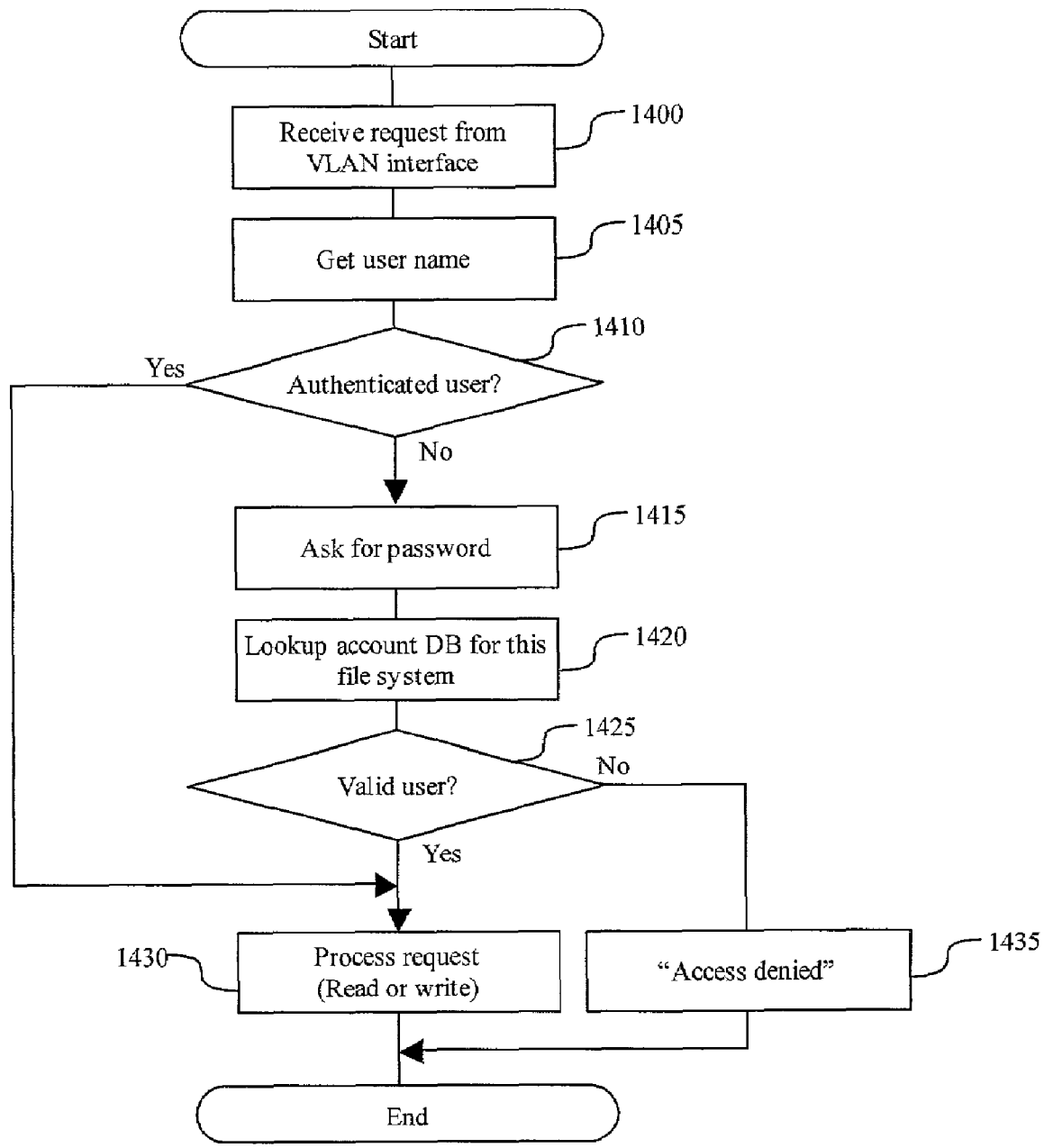
Fig. 14 Flowchart of request processing

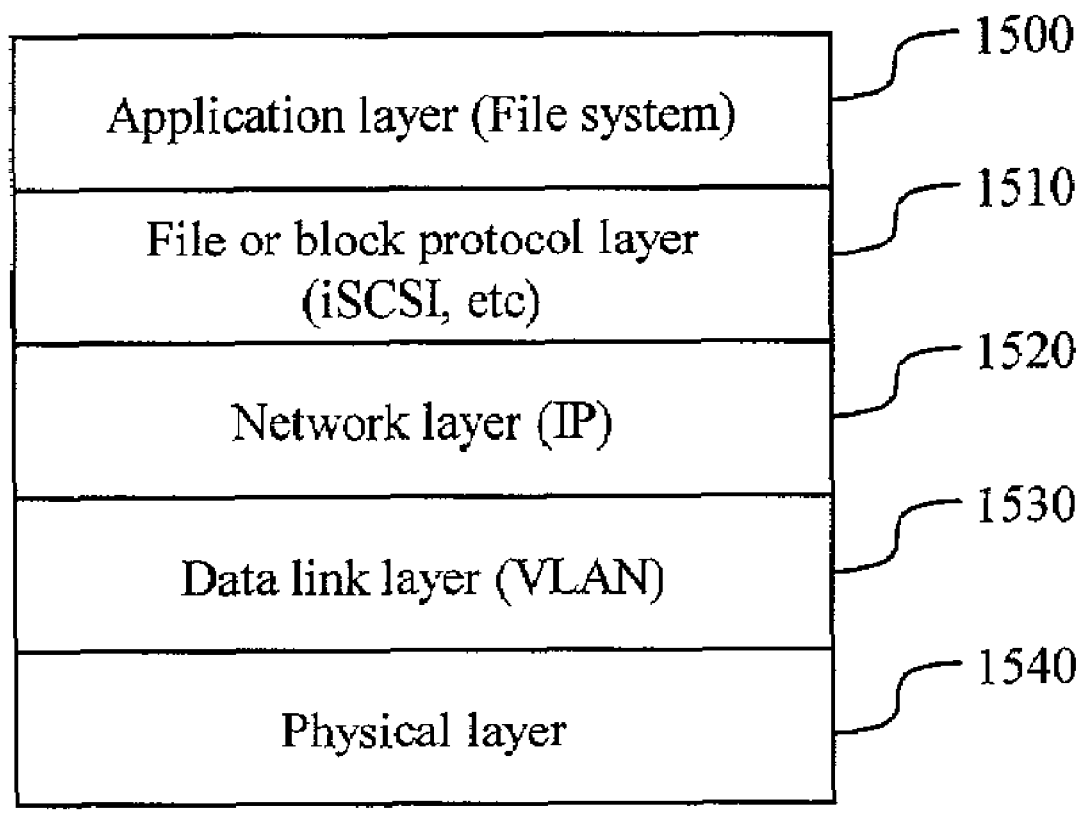
Fig. 15 Protocol stack

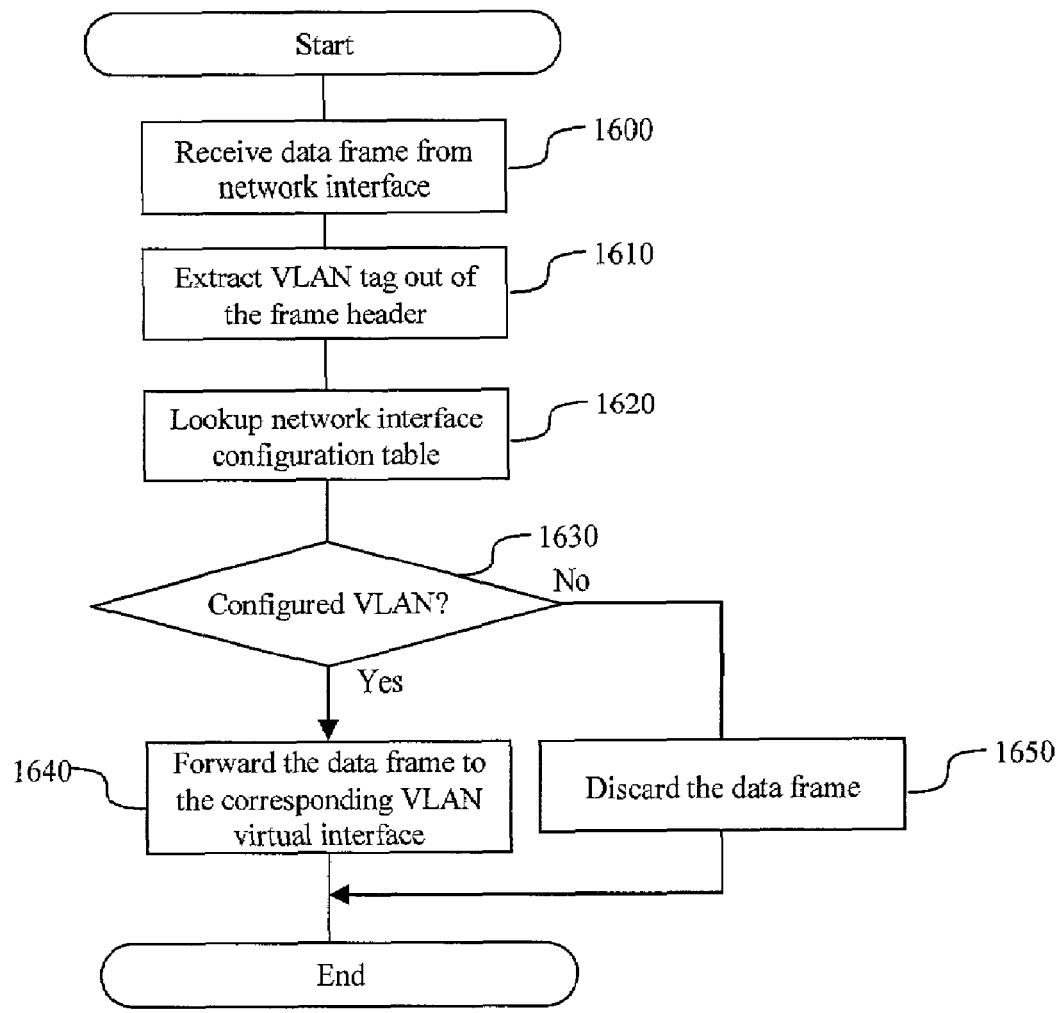
Fig. 16 Flowchart of identification of VLAN membership of received frame

SYSTEM AND METHOD FOR PROVIDING AND USING A VLAN-AWARE STORAGE DEVICE

BACKGROUND OF THE INVENTION

The present invention relates generally to techniques for securing networked storage devices, and in particular to techniques for enhancing security of IP networked storage devices.

Conventionally, many of today's storage devices such as Redundant Array of Independent Disks (RAID) are connected to servers through Fibre Channel networks. As Internet Protocol (IP) based technology becomes a de facto standard in the networking area, storage devices are tending to become more IP capable.

While certain advantages are perceived, opportunities for further improvement exist. For example, he more familiar IP-based storage technology becomes, the greater is the security risk of storage access. Though IP storage access protocol has its own security measures, it is desirable to have more stringent security management features incorporated into the storage device itself. Accordingly, a need for greater security than that provided by conventional mechanisms used today presents itself.

What is needed are improved security techniques for network based storage devices.

SUMMARY OF THE INVENTION

The present invention provides secure IP protocol capable storage devices using Virtual Local Area Network (VLAN) techniques. Specific embodiments of the present invention provide techniques for securing VLAN aware storage devices, and the like. In specific embodiments, techniques according to the present invention can provide Internet data centers that are responsible for keeping their customer's computers and storages safe and secure with the capability to strictly separate LAN access for different customers using VLAN (virtual LAN) technology.

In a representative embodiment, a storage apparatus is provided. The storage apparatus comprises a processor; a memory; at least one of a plurality of storage devices. A storage controller is coupled with the at least one of a plurality of storage devices. A network interface connectable to a virtual local area network (VLAN) switch provides connectivity. The processor is at least intermittently coupled with the memory, the storage controller and the network interface. The memory is operable to store configuration information, including a correspondence between at least one of a plurality of segments of a virtual local area network (VLAN) connectable by the network interface and at least one of a plurality of virtual volumes of the at least one of a plurality of storage devices. The processor, the memory, the storage controller and the network interface are operable to control a virtual local area network (VLAN) switch to map the at least one of a plurality of segments of a virtual local area network (VLAN) connectable by the network interface to the at least one of a plurality of virtual volumes of the at least one of a plurality of storage devices based upon the configuration information. For example, a server of customer A belongs to VLAN segment 1 and a server of customer B to VLAN segment 2. In this case, customer access may be confined to their own server.

In specific embodiments, the apparatus can further comprise an out of band management interface connectable to a second network. Further, in some specific embodiments, the network interface can be connectable to a virtual local area network (VLAN) switch comprises an interface to a VLAN trunk line. In such specific embodiments, the information carried by the VLAN trunk line is identified using an embedded tag, for example.

In specific embodiments, the network interface connectable to a virtual local area network (VLAN) switch comprises an interface to a VLAN switch, the VLAN switch connectible to at least one of a plurality of host computers via at least one of a plurality of VLAN access links. In such specific embodiments, the information carried by the at least one of a plurality of VLAN access links comprises untagged frames. The information carried by the at least one of a plurality of VLAN access links may be identified using a VLAN Identifier of a receiving port, for example. The information carried by the at least one of a plurality of VLAN access links may be identified using a Media Access Control (MAC) address, or the like, in some embodiments. In specific embodiments, the untagged frame comprises a preamble field; a source MAC field; a destination MAC field; a type field; a data field; and a CRC field.

In a representative embodiment, a method is provided. The method comprises separating logically a local area network into a plurality of virtual local area networks, including a first virtual local area network and a second virtual local area network. Separating logically a storage device into a plurality of virtual volumes, including a first virtual volume and a second virtual volume is also part of the method. Further, the method includes mapping the first virtual local area network to the first virtual volume and the second virtual local area network to the second virtual volume to form a configuration and routing information from the first virtual local area network to the first virtual volume and the second virtual local area network to the second virtual volume based upon the configuration.

In specific embodiments, the method can further comprise one or more of configuring network parameters; configuring a new file system; configuring a designated file system; and deleting a designated file system. Further, in specific embodiments, the method can also include one or more of updating a management interface IP address; updating a physical network interface IP address; updating a VLAN interface IP address and a VLAN tag; deleting a designated VLAN interface; and adding a new VLAN interface. In further specific embodiments, the method also comprises at least one of adding a VLAN to a file system; removing a VLAN from the file system; adding a volume to the file system; and removing a volume from the file system. In yet further embodiments, authenticating user authority can be part of the method.

In another representative embodiment, a computer program product is provided. The computer program product comprises a computer readable storage medium that contains code for sending and receiving tagged frames to and from a network interface; code for managing a file system; and code for managing a virtual volume within the file system. Code for controlling data transfer between the network interface and a storage controller of the file system and code for routing information from a virtual local area network to a virtual volume in the file system based upon a configuration can also be stored on the computer readable storage medium.

In specific embodiments, the computer program product further comprises at least one of code for receiving configuration information for the file system; code for receiving configuration information for the virtual volume; and code for receiving configuration information for the virtual local area network. Further, in specific embodiments, the computer program product further comprises at least one of code for updating configuration information for the file system; code for updating configuration information for the virtual volume; and code for updating configuration information for the virtual local area network.

In a representative embodiment, a computer apparatus is provided. The computer apparatus comprises a means for processing information and a means for connecting to a virtual local area network (VLAN) switch. The means for processing and the means for connecting to a virtual local area network (VLAN) switch are connectable to an external storage device having at least one of a plurality of volumes mapped to at least one of a plurality of segments of a virtual local area network (VLAN) based upon configuration information.

In a representative embodiment, a storage apparatus is provided. The storage apparatus comprises a means for processing information; a means for storing data; a means for controlling storing of data; and a means for connecting to a virtual local area network (VLAN) switch. The means for processing, the means for controlling storing of information and the means for connecting to a virtual local area network (VLAN) switch map at least one of a plurality of segments of a virtual local area network (VLAN) to at least one of a plurality of virtual volumes of the means for storage data based upon configuration information.

In a representative embodiment, a system is provided. The system comprises a storage device. A virtual local area network (VLAN) switch is coupled to the storage device. The system also includes at least one of a plurality of devices coupled to the virtual local area network (VLAN) switch via at least one of a plurality of virtual local area networks. The storage device is operable to control the virtual local area network (VLAN) switch to map at least one of a plurality of segments of at least one of a plurality of virtual local area networks to at least one of a plurality of virtual volumes of at least one of a plurality of storage devices based upon configuration information.

In a representative embodiment, a method of controlling accesses from servers at a disk subsystem is provided. The method is especially useful in conjunction with a disk subsystem that is connected to a virtual local area network (VLAN) switch via a VLAN trunk and receives access requests from the servers via the VLAN switch and the VLAN trunk. The method comprises the steps of allocating storage resource to each VLAN segment and receiving an Internet Protocol (IP) packet based access from a server. Determining a VLAN segment that the server belongs to, based on a VLAN identification in the IP packet, and permitting the server to access the storage resource allocated to the VLAN segment that the server belongs to are also part of the method.

In a representative embodiment, a method is provided. The method comprises separating a virtual LAN into a plurality of segments; mapping each one of the plurality of segments to a storage device; and assigning at least one of a plurality of virtual volumes to each one of the plurality of segments.

Numerous benefits are achieved by way of the present invention over conventional techniques. In specific embodiments of the present invention, a VLAN aware network interface and its management functions can be incorporated into storage devices. Specific embodiments according to the present invention provide enhanced security for VLAN aware IP networked storage devices. Using specific embodiments according to the present invention, storage device users can have not only IP-based storage access protocol (iSCSI and iSNS), but also VLAN-based access security.

These and other benefits are described throughout the present specification. A further understanding of the nature and advantages of the invention herein may be realized by reference to the remaining portions of the specification and the attached drawings.

BRIEF DESCRIPTION OF THE DRAWINGS

FIG. 1 illustrates two frame formats in a specific embodiment according to the present invention.

FIG. 2 illustrates the system configuration of the storage device with VLAN support in a specific embodiment according to the present invention.

FIG. 3 illustrates the VLAN configuration table of a VLAN switch in a specific embodiment according to the present invention.

FIG. 4 illustrates a representative storage device operable to store information in specific embodiments according to the present invention.

FIG. 5 illustrates representative software modules operable to control functioning of the storage device in a specific embodiment according to the present invention.

FIG. 6 illustrates a network interface configuration table in a specific embodiment according to the present invention.

FIG. 7 illustrates a file system configuration table in a specific embodiment according to the present invention.

FIG. 8 illustrates a system configuration window in a specific embodiment according to the present invention.

FIG. 9 illustrates a network configuration window in a specific embodiment according to the present invention.

FIG. 10 illustrates a file system configuration window in a specific embodiment according to the present invention.

FIG. 11 illustrates a flowchart of processing of system configuration window in a specific embodiment according to the present invention.

FIG. 12 illustrates a flowchart of processing of network configuration window in a specific embodiment according to the present invention.

FIG. 13 illustrates a flowchart of processing of file system configuration window in a specific embodiment according to the present invention.

FIG. 14 illustrates a flowchart of processing of request received from the network in a specific embodiment according to the present invention.

FIG. 15 shows the protocol stack of the storage device in a specific embodiment according to the present invention.

FIG. 16 shows a flowchart of processing of incoming data frames in a specific embodiment according to the present invention.

DESCRIPTION OF THE SPECIFIC EMBODIMENTS

The present invention provides secure IP protocol capable storage devices, systems and methods using Virtual Local Area Network (VLAN) techniques. Specific embodiments of the present invention provide techniques for securing VLAN aware storage devices, and the like. Unlike conventional storage devices that are used in conjunction with Fibre Channel networks that do not support VLAN technology, embodiments of the present invention may be used with IP networks and IP based storage access protocols.

IP-based storage access protocol is now being discussed in Internet Engineering Task Force (IETF), the standardization organization in IP network technology. For example, the IETF is developing an IP based storage access protocol called iSCSI. The Small Computer System Interface (SCSI) is an established storage access protocol and iSCSI is a kind of tunneling protocol that makes it possible to transmit SCSI protocol packet over IP network. The protocol called iSCSI ("iSCSI," http://www.ietf.org/internet-drafts/draft-ietf-ips-iscsi-07.txt) is a block transfer protocol in IP network.

Access control in IP-based storage networks can be enabled using various access security mechanisms such as IPsec protocol ("Security Architecture for the Internet Protocol," RFC 2401) and iSNS ("iSNS Internet Storage Name Service," http://www.ietf.org/internet-drafts/draft-ietf-ips-isns-04.txt). In specific embodiments, the present invention can provide enhanced functionality for IP-based storage access technologies using VLAN technology.

Although the present invention will be described herein using references to specific embodiments employing VLAN, a general concept to enable multiple logical networks in a single physical LAN segment, a variety of other techniques can also be used in various specific embodiments. For example, many existing networks use a standard technology called IEEE 802.1 q ("IEEE Standards for Local and Metropolitan Area Networks: Virtual Bridged Local Area Networks," IEEE, ISBN-0738115371 or http://standards.ieee-.org/reading/ieee/std/lanman/802.1Q-1998.pdf). These and other types of networking standards may be used in the many and varying specific embodiments according to the present invention, as will be readily apparent to those skilled in the art.

Overview

IP-based storage access protocol has its own security mechanism in it. However, in highly secure networks, additional security measure should be taken to eliminate the possibility of illegal data access from unauthorized LAN segment.

Specific embodiments according to the present invention address this problem by adding VLAN capabilities to storage devices. The storage devices described herein can send and receive VLAN aware frames (or packets) and process these frames properly according to the management configurations. For example, as illustrated herein below with respect to FIGS. 6 and 7, a VLAN segment may be mapped to virtual storage volumes that are allowed to the VLAN segment. File systems can also be mapped to a VLAN. A server that belongs to a certain VLAN can have access to the file system and the virtual storage volumes that are allowed to the users of the VLAN only.

Note that, while the present invention is described generally with reference to specific embodiments that include Network Attached Storage (NAS) like storage devices, the present invention is not limited to such embodiments. Techniques according to the present invention can also provide specific embodiments having ordinary storage devices without NAS capabilities, such as storage devices within a RAID or using file system software, for example.

VLAN Technology

VLAN is a technology that enables more than one subnetwork (or broadcast domains) to coexist in a single LAN segment.

In a conventional LAN, there is only one subnetwork (or broadcast domain) in a certain LAN segment. In this configuration, each end station connected to the LAN segment can transmit and receive data frames to and from the LAN. This means that there is no means to keep a certain end station from communicating with another end station on the LAN segment.

VLAN technology makes it possible to split a LAN segment into several virtual LAN segments. An End station that belongs to a certain VLAN segment does not communicate with another end station that belongs to a different VLAN segment.

VLAN Type

There are several VLAN types, which may be classified according to the criteria that determine membership of end stations to VLAN segments. The following are two typical VLAN types.

1. Port-Based VLAN

A VLAN switch can assign a VLAN ID to end stations that are connected to a certain switch port. This is called port-based VLAN.

2. Address-Based VLAN

A VLAN switch can assign a VLAN ID to end stations that have a designated MAC (Media Access Control) address. This is called address-based VLAN.

Frame Format

In a representative VLAN network, there can be two types of frame formats. FIG. 1 illustrates two frame formats in a specific embodiment according to the present invention. In FIG. 1, two frame formats, untagged frames and tagged frames, are depicted.

1. Untagged Frame

Untagged frames are used on links other than VLAN trunks. Many existing end stations such as servers, PCs and network hubs are not VLAN-aware and cannot recognize tagged frames. VLAN membership of untagged frames is determined by VLAN ID of a receiving switch port (port-based VLAN) or MAC address of the frame (address-based VLAN).

An untagged frame 100 contains the following fields. "Preamble" is a field to enable the detection of a frame by a receiving end stations. "Source MAC" field contains a MAC address of the end station that sends this frame. "Destination MAC" field contains a MAC address of the end station that receives this frame. "Type" field describes the type of this frame. "Data" field is filled with the upper layer protocols such as Internet protocol. "CRC" field is used for error detection.

2. Tagged Frame

Tagged frames are used on a VLAN trunk link. End stations connected to VLAN trunk are VLAN-aware and can extract VLAN ID information embedded in the frames. In addition to the other fields contained in an untagged frame, tagged frame 110 contains a field 120 called "tag header," which contains VLAN ID information.

The storage device described in specific embodiments according to the present invention is VLAN-aware; it can send and receive tagged VLAN frames.

System Configuration

FIG. 2 illustrates the system configuration of the storage device with VLAN support in a specific embodiment according to the present invention. Storage device 200 has a network interface connected to VLAN trunk 210, which leads to a switch port of VLAN switch 220. The storage device has another network interface connected to the management network 270. Within the storage device 200, there are several file systems and storage volumes.

VLAN switch 220 has several switch ports. Port number 8 is a VLAN trunk and tagged frames are transmitted to and from this port. Other switch ports from number 1 to number 7 are access links 240. Untagged frames are transmitted to and from these ports.

Servers S-1 (261), S-2 (262) and S-3 (263) belong to VLAN #1 (251). Servers S-4 (264) and S-5 (265) belong to VLAN #2 (252). Servers S-6 (266) and S-7 (267) belong to VLAN #3 (253).

FIG. 3 illustrates the VLAN configuration table of a VLAN switch in a specific embodiment according to the present invention. The VLAN configuration table illustrated by FIG. 3 can be configuration table 300 of VLAN switch 220, for example. Port-based VLAN is used in this embodiment. The table 300 is used to store VLAN configuration information of the VLAN switch 220.

The table 300 comprises a plurality of fields. "Port No" identifies the port number of the VLAN switch. "VLAN trunk" tells if the switch port is VLAN trunk link or not. "VLAN ID (Tag)" is a VLAN ID that is associated with the packets received on the switch port. "Other switch port attributes" contains miscellaneous configuration parameters of the switch port.

Hardware Configuration

FIG. 4 illustrates a representative storage device operable to store information in specific embodiments according to the present invention. Storage device 200 comprises of the following hardware components.

CPU 410 executes various programs stored in main memory 420, which holds programs and data used to implement functions and processes in accord with the present invention. Secondary memory 430 stores programs and data in persistent memory devices such as hard disks and flash memories. CPU 410 loads those programs and data stored in secondary memory 430 into main memory 420. Network interface 440 connects to the network link, which in turn connects to VLAN switch 220. Out-of-band management interface 450 connects to management network 270.

CPU 410, main memory 420, secondary memory 430, network interface 440 and out-of-band management interface 450 are connected through controller bus 480.

Storage device 200 comprises one or more storage volumes 470. Those storage volumes are connected to storage controller 460 via storage bus 490. Storage controller 460 is also connected to controller bus 480. The communication between components that are connected to controller bus 480 and storage bus 490 is accomplished through storage controller 460.

Software Configuration

Software Modules

FIG. 5 illustrates the software modules operable to control functioning of the storage device in a specific embodiment according to the present invention. The software modules illustrated in FIG. 5 can be operatively disposed in main memory 420 of storage device 200, for example.

Network interface device driver 580 sends and receives tagged frames to and from network interface 240. The device driver 580 also sends and receives untagged frames to and from out-of-band management interface 450.

There are as many VLAN virtual interfaces 570 as configured by the operator. Each VLAN interface is assigned a certain VLAN ID and is responsible for processing of those frames that belong to the VLAN ID. There are as many file server modules 560 as configured by the operator. Each file server module manages a different file system. There are as many virtual volume managers 550 as configured by the operator. A storage access device driver 510 is responsible for data transfer between virtual volume managers 550 and storage controller 460.

An operator GUI module 500 is a user interface program that system operators use to manage the storage device 200. Through this GUI module 500, operators can communicate with storage management module 520, file systems management module 530 and network management module 540. Storage management module 520 is responsible for the configuration and management of virtual volume managers 550. File system management module 530 is responsible for the configuration and management of file server modules 560. A network management module 540 is responsible for configuration and management of VLAN virtual interfaces 570.

Data Management

The configuration information of the storage device 200 is stored in several data tables that are located in main memory 420.

1. Network Interface Configuration Table

FIG. 6 illustrates a network interface configuration table in a specific embodiment according to the present invention. The network interface table 600 is used to manage both physical and virtual network interfaces equipped on the storage device 200. Physical interfaces correspond to the hardware of the network interface (network interface 440 and out-of band management interface are both physical network interfaces). On the other hand, virtual network interfaces correspond to the VLAN segment, which is actually bind to a certain physical network interface. In the example shown in FIG. 6, three virtual interfaces, "vlan 1," "vlan 2" and "vlan 3," correspond to the physical network interface exp0.

The network interface table 600 comprises a plurality of fields. "Interface number" is a sequence number to manage the network interface configuration information. "Interface name" is an alphanumeric name assigned to the network interface for human readability. "Physical interface name" is the name of the physical interface that is related to this network interface. "VLAN ID" is only valid for the virtual network interface and shows the VLAN ID or tag for that VLAN. "IP Address" is an IP address that is assigned to the network interface. "Maximum throughput" is the parameter to specify the maximum throughput allowed to this network interface. "Management" is a flag that tells if this network interface is used for system management purpose or not.

2. File System Configuration Table

FIG. 7 illustrates a file system configuration table in a specific embodiment according to the present invention. The file system configuration table 700 is used to manage all the file systems in the storage device 200. The storage device of specific embodiments according to the present invention can have more than one file systems and is very flexible because mapping between VLAN interfaces and file systems can be easily defined and changed using this configuration table.

The file system configuration table 700 comprises a plurality of fields. "Interface number" is a sequence number to manage the file system configuration information. "File server module" is a unique number that identifies the file server module or program. "Allowed interfaces" are the network interfaces that are allowed to connect to this file system. "Allowed volumes" are the virtual volumes that are allowed to connect to this file system.

User Interfaces

System Configuration Window

FIG. 8 illustrates a system configuration window in a specific embodiment according to the present invention. The operator of the storage device 200 uses this window to configure the basic information that is needed to manage the storage device 200. An operator can assign IP address to this device, add or delete file systems and change the mapping between VLAN and virtual volumes using the system configuration window. Clicking on "configure" button 810 brings up a network configuration window 900 shown in FIG. 9. Clicking on "configure" button 820 brings up a file system configuration window 1000 shown in FIG. 10.

Network Configuration Window

FIG. 9 illustrates a network configuration window in a specific embodiment according to the present invention. In this window, the operator can configure network information such as IP address and throughput assigned to the interface. Both network interface 440 and management interface 450 can be configured using this window.

In the example shown in FIG. 9, the management interface "exp1" is assigned an IP address 192.168.1.1, with subnet mask 24 and the throughput allowed for the management interface is 10 Mbps. There is one network interface "exp0" and it is assigned an IP address 10.0.4.1, with subnet mask 24 and through put 100 Mbps. The interface "exp0" belongs to three VLANs, "vlan1," "vlan2" and "vlan3." Each VLAN is assigned its own IP address, VLAN ID (tag) and throughput.

File System Configuration Window

FIG. 10 illustrates a file system configuration window in a specific embodiment according to the present invention. In this window, the operator can configure file system information such as connected VLANs and connected storage volumes. In the example shown in FIG. 10, the file system #1 is connected to the VLAN "vlan2" and allowed to use storage volume "vol4."

Processing Flows

Flowchart of System Configuration

FIG. 11 illustrates a flowchart of processing of system configuration window in a specific embodiment according to the present invention. When the operator GUI module 500 receives a command from the operator to activate the system configuration window, the GUI module 500 displays the system configuration window 800 (step 1100). The module 500 tests if the requested operation is network configuration (step 1105). If the requested operation is network configuration, the module shows a network configuration window 900 (step 1110). Then, the module 500 tests if the requested operation is "add new file system" (step 1115). If the requested operation is "add new file system," the module shows file system configuration window 1000 (step 1120). Otherwise, the module tests if the requested operation is "configure file system" (step 1125). If the requested operation is "configure file system," the module shows file system configuration window 1000 (step 1130). Otherwise, the module tests if the requested operation is "delete file system" (step 1135). If the requested operation is "delete file system," the module deletes the file system (step 1140). If any configuration change occurs, the operator GUI module displays the updated configuration information (step 1145). The above processing is repeated until the operator requests to close the system configuration window (step 1150).

Flowchart of Network Configuration

FIG. 12 illustrates a flowchart of processing of network configuration window in a specific embodiment according to the present invention. When operator GUI module 500 receives a command from the operator to activate the network configuration window, the module display the network configuration window 900 (step 1200). The module 500 tests if the requested operation is "update management interface" (step 1205). If the requested operation is "update management interface," the module 500 updates the IP address of the management interface (step 1210). Otherwise, the module 500 tests if the requested operation is "update LAN" (step 1215). If the requested operation is "update LAN," the module 500 updates the IP address of the physical network interface (step 1220). Otherwise, the module tests if the requested operation is "update VLAN" (step 1225). If the requested operation is "update VLAN," the module update the IP address and VLAN tab information of the VLAN interface (step 1230). Otherwise, the module tests if the requested operation is "delete VLAN" (step 1235). If the requested operation is "delete VLAN," the module deletes the designated VLAN interface (step 1240). Otherwise, the module tests if the requested operation is "add VLAN" (step 1245). If the requested operation is "add VLAN," the module 500 adds new VLAN interface (step 1250).

If any network configuration change occurs, the operator GUI module 500 invokes network management module to update the network interface configuration table (step 1255) and display the updated network configuration information (step 1260). The above processing is repeated until the operator requests to close the system configuration window (step 1265).

Flowchart of File System Configuration

FIG. 13 illustrates a flowchart of processing of file system configuration window in a specific embodiment according to the present invention. When operator GUI module 500 receives a command from the operator to activate the file system configuration window, the GUI module 500 displays the network configuration window 1000 (step 1300). The module 500 tests if the requested operation is "add VLAN" (step 1305). If the requested operation is "add VLAN," the module 500 invokes the file system management module to add the designated VLAN to the designated file system (step 1310). Otherwise, the module tests if the requested operation is "remove VLAN" (step 1315). If the requested operation is "remove VLAN," the module 500 invokes the file system management module to remove the designated VLAN from the designated file system (step 1320). Otherwise, the module 500 tests if the requested operation is "add volume" (step 1325). If the requested operation is "add volume," the module 500 invokes the file system management module to add the designated volume to the designated file system (step 1330). Otherwise, the module 500 tests if the requested operation is "remove volume" (step 1335). If the requested operation is "remove volume," the module 500 invokes the file system management module to remove the designated volume from the designated file system (step 1340).

If any file system configuration change occurs, the operator GUI module 500 invokes file system management module to update the file system configuration table (step 1345) and display the updated file system configuration information (step 1350). The above processing is repeated until the operator requests to close the system configuration window (step 1355).

Flowchart of Request Processing

FIG. 14 illustrates a flowchart of processing of request received from the network in a specific embodiment according to the present invention. When the file server module 560 receives a request from a certain VLAN interface 570 (step 1400), it then retrieves the user name from the request (step 1405). The file server module 560 tests if the request comes from the authenticated user for the file system (step 1410). If the user has not been authenticated, file server module 560 asks the user for a password (step 1415) and looks in the account database of this file system for the received password (step 1420). File server module 560 tests if valid user information was found in the database (step 1425). If valid user information was found, the file server module 560 processes the received request properly (step 1430). If valid user information was not found, the file server module denies the request (step 1435).

The storage device of specific embodiments according to the present invention can have more than one file server modules 560. Each file server module 560 processes requests that are received from the designated VLAN only. As a result, the storage device of specific embodiments according to the present invention is enhanced with tighter security than conventional storage devices with no VLAN support.

FIG. 15 shows the protocol stack of the storage device in a specific embodiment according to the present invention. The bottom of the stack is the physical layer 1540, which is responsible for physical input and output of data frames. The data link layer 1530 is responsible for the processing of data frames. VLAN-related processing, such as VLAN membership identification is done within this layer in specific embodiments. Network layer 1520 is responsible for the processing of network protocol such as IP. File or block protocol layer 1510 handles the storage-specific requests. Such requests are file level ones for NAS type of devices and block level ones for iSCSI type of devices, for example. The top layer is the application layer or file systems 1500. This layer is responsible for the processing of application logic, which, in this case, is file input and output.

FIG. 16 shows a flowchart of processing of incoming data frames in a specific embodiment according to the present invention. The incoming data frame sent from one of servers is received by the network interface 440 (step 1600). Because the network interface 440 is connected to the VLAN trunk link 210, the incoming data frame is tagged frame 110 with VLAN tag header 120. Therefore, the network interface device driver 550 extracts the VLAN tag out of the received data frame (step 1610). Then, the network interface device driver 580 performs lookups in the network interface configuration table 600 attempting to find an entry, or VLAN corresponding to the extracted tag information (step 1620). The device driver 580 checks if the lookup results is in one of the configured VLAN entries in network interface configuration table 600 (step 1630). If the corresponding VLAN entry for the incoming data frame is found, the data frame is forwarded to the corresponding VLAN virtual interfaces 570 (step 1640). If the corresponding VLAN entry for the incoming data frame is not found, the data frame is discarded (step 1650).

In IP-based storage systems, access security is provided using segment separation technology such as VLAN. By supporting capabilities to identify incoming packets on a per VLAN basis, storage devices provide users with additional security features.

The storage device with VLAN support can restrict the access to the file system and storage volumes according to the VLAN membership of the requesting users. If a user belongs to VLAN A, the user can use those file systems and storage volumes that are assigned to VLAN A exclusively. In addition to the separation based on VLAN membership, regular security measures defined by IP-based storage access protocol can also be enforced within each VLAN segment. In this sense, VLAN support is considered to provide additional security features to the storage devices.

The preceding has been a description of the preferred embodiment of the invention. It will be appreciated that deviations and modifications can be made without departing from the scope of the invention, which is defined by the appended claims.

What is claimed is:

1. A storage apparatus, comprising:
a processor;
a memory;
at least one storage device operable to provide storage resources for storing user data over a network to at least one network entity and comprising a plurality of virtual volumes;
a storage controller, coupled to the at least one storage device;
a network interface connectable to the virtual local area network (VLAN) switch;
a user interface;
wherein the processor is at least intermittently coupled to the memory, the storage controller and the network interface;
wherein the memory comprises configuration information including information on at least one file system, the at least one file system being used by a computer different from the storage apparatus to store data in the storage apparatus, each file system being managed by each of a plurality of file server modules, information on mapping of a plurality of segments of a virtual local area network (VLAN) connectable by the network interface to the at least one file system and information on mapping of the plurality of virtual volumes of the at least one storage device to the at least one file system;
wherein the processor, the memory, the storage controller and the network interface are operable to control the virtual local area network (VLAN) switch to map the plurality of segments to the at least one file system and the plurality of virtual volumes to the at least one file system based upon the configuration information;
wherein at least one of the processor or the network interface control access to the plurality of virtual volumes based upon the configuration information such that a specific network entity associated with at least one of the plurality of segments is allowed to access the plurality of virtual volumes within the at least one file system:
wherein the user interface is operable to provide a user with information on mapping between the at least one file system and the plurality of segments of the virtual local area network (VLAN) and information on mapping between the at least one file system and the plurality of virtual volumes; and
wherein at least one of the processor, the memory, the storage controller and the user interface is operable to update the configuration information based on a request of the user mapping and un-mapping the plurality of segments of the VLAN to the at least one file system and update the configuration information based on the request of the user mapping and un-mapping the plurality of volumes to the at least one file system.

2. The apparatus of claim 1,
further comprising an out of band management interface connectable to a second network.

3. The apparatus of claim 1,
wherein the network interface connectable to a virtual local area network (VLAN) switch comprises an interface to a VLAN trunk line.

4. The apparatus of claim 3,
wherein information carried by the VLAIN trunk line is identified using an embedded tag.

5. The apparatus of claim 1,
wherein the network interface connectable to a virtual local area network (VLAN) switch comprises an interface to a VLAN switch, the VLAN switch connectible to at least one host computer via at least one VLAN access link.

6. The apparatus of claim 5,
wherein information carried by the at least one VLAN access link comprises untagged frames.

7. The apparatus of claim 6,
wherein information carried by the at least one VLAN access link is identified using a VLAN Identifier of a receiving port.

8. The apparatus of claim 6,
wherein information carried by the at least one VLAN access link is identified using a Media Access Control (MAC) address.

9. The apparatus of claim 6,
wherein an untagged frame comprises:
a preamble field;
a source MAC field;
a destination MAC field;
a type field;
a data field; and
a CRC field.

10. A method, comprising:
separating logically a local area network into a plurality of virtual local area networks, including a first virtual local area network and a second virtual local area network;
separating logically a storage device operable to provide storage resources for storing user data over the local area network to at least one network entity into a plurality of virtual volumes, including a first virtual volume and a second virtual volume;
establishing at least one file system, the at least one file system being used by a computer different from the storage device to store data in the storage device, each file system being managed by each of a plurality of file server modules;
managing a configuration comprising a mapping of the plurality of virtual local area networks to the at least one file system and a mapping of the plurality of virtual volumes to the at least one file system; and
routing information from a network entity associated with one of the plurality of virtual local area networks to the plurality of virtual volumes and preventing communication from a second network entity not associated with the plurality of virtual local area networks to the plurality of virtual volumes based upon the configuration;
wherein the managing, routing and preventing is performed by the storage device;
providing a user with information on mapping between the at least one file system and at least one of the first virtual local area network and the second virtual local area network and information on mapping between the at least one file system and the plurality of virtual volumes;
updating the configuration information based on a request of the user mapping and un-mapping the at least one of the first virtual local area network and the second virtual local area network to the at least one file system; and
updating the configuration information based on the request of the user mapping and un-mapping the plurality of volumes to the at least one file system.

11. The method of claim 10,
further comprising at least one of:
configuring network parameters;
configuring a new file system;
configuring a designated file system; and
deleting a designated file system.

12. The method of claim 10,
further comprising at least one of:
updating a management interface IP address;
updating a physical network interface IP address;
updating a VLAN interface IP address and a VLAN tag;
deleting a designated VLAN interface; and
adding a new VLAN interface.

13. The method of claim 10,
further comprising at least one of:
adding a VLAN to a file system;
removing a VLAN from the file system;
adding a volume to the file system; and
removing a volume from the file system.

14. The method of claim 10,
further comprising:
authenticating user authority.

15. A computer program product embodied in a computer-readable medium, comprising:
code for sending and receiving tagged frames to and from a network interface;
code for managing a file system and providing storage resources for storing user data over a network to at least one network entity;
code for managing a plurality of virtual volumes within the file system;
code for controlling data transfer between the network interface and a storage controller of the file system;
code for creating at least one file system, the at least one file system being used by a computer different from a storage device to store data in the storage device, each file system being managed by each of a plurality of file server modules;
code for managing a configuration comprising a mapping of the plurality of virtual volumes to the at least one file system and mapping of a plurality of a virtual local area network segments to the at least one file system;
code for routing information from a network entity associated with at least one of the plurality of virtual local area network segments to the plurality of virtual volumes in the file system and preventing communication from at least one other virtual local area network segment to the plurality of virtual volumes based upon the configuration;
code for providing a user with information on mapping between the at least one file system and the plurality of virtual local area network segments and information on mapping between the at least one file system and the plurality of virtual volumes;
code for updating the configuration information based on a request of the user mapping and un-mapping at least one of the plurality of virtual local area network segments to the at least one file system; and code for updating the configuration information based on the request of the user mapping and un-mapping the plurality of volumes to the at least one file system; and a computer readable storage medium for holding the codes, wherein the managing of the configuration, routing and preventing are performed by a storage device hosting the file system.

16. The computer program product of claim 15, further comprising at least one of:

code for receiving configmation information for the file system;

code for receiving configuration information for the virtual volume; and code for receiving configuration information for the virtual local area network segment.

17. The computer program product of claim 16, further comprising at least one of:

code for updating configuration information for the file system;

code for updating configuration information for the virtual volume; and code for updating configuration information for the virtual local area network segment.

18. A network storage apparatus, comprising:

a means for processing information;

a means for connecting to a virtual local area network (VLAN) switch; and a user interface means;

wherein the means for processing and the means for connecting to a virtual local area network (VLAN) switch are connectable to a storage device operable to provide storage resources for storing user data over a network to at least one network entity having a plurality of virtual volumes mapped to at least one file system, the at least one file system being used by a computer different from the storage apparatus to store data in the storage apparatus, each file system being managed by each of a plurality of file server modules, and a plurality of segments of a virtual local area network (VLAN) mapped to the at least one file system, based upon configuration information managed by the processing means, thereby enabling communication between a network entity associated with one of the plurality of segments of the virtual local area network and the plurality of virtual volumes and preventing communication between another segment of another VLAN and the plurality of virtual volumes;

wherein the user interface means is operable to provide a user with information on mapping between the at least one file system and the plurality of segments of the virtual local area network (VLAN) and information on mapping between the at least one file system and the plurality of virtual volumes; and wherein at least one of the processing means and the user interface means is operable to update the configuration information based on a request of the user mapping and un-mapping the plurality of segments of the VLAN to the at least one file system and update the configuration information based on the request of the user mapping and un-mapping the plurality of volumes to the at least one file system.

19. A storage apparatus, comprising:

a means for processing information;

a means for storing data operable to provide storage resources for storing user data provided over a network to at least one network entity;

a means for controlling storing of data;

a means for connecting to a virtual local area network (VLAN) switch; and a user interface means;

wherein the means for processing, the means for controlling storing of information and the means for connecting to a virtual local area network (VLAN) switch map a plurality of segments of a virtual local area network (VLAN) to at least one file system, the at least one file system being used by a computer different from the storage apparatus to store data in the storage apparatus, each file system being managed by each of a plurality of file server modules, and map a plurality of virtual volumes of the means for storing data to the at least one file system based upon configuration information, enable communication between a network entity associated with one of the plurality of segments of the virtual local area network and the plurality of virtual volumes and prevent communication between another segment of another VLAN and the plurality of virtual volumes;

wherein the user interface means is operable to provide a user with information on mapping between the at least one file system and the plurality of segments of the virtual local area network (VLAN) and information on mapping between the at least one file system and the plurality of virtual volumes; and wherein at least one of the means for processing, the means for controlling storing of information and the user interface means is operable to update the configuration information based on a request of the user mapping and un-mapping the plurality of segments of the VLAN to the at least one file system and update the configuration information based on the request of the user mapping and un-mapping the plurality of volumes to the at least one file system.

20. A system, comprising:

a storage device operable to provide storage resources for storing user data over a network to at least one network entity;

a virtual local area network (VLAN) switch, coupled to the storage device; and a plurality of segments coupled to the virtual local area network (VLAN) switch via at least one virtual local area network; and a user interface, wherein the storage device is operable to map the plurality of segments of the virtual local area network to at least one file system, the at least one file system being used by a computer different from the storage device to store data in the storage device, each file system being managed by each of a plurality of file server modules, and map a plurality of virtual volumes of the storage device to the at least one file system, based upon configuration information, and is operable to enable communication between a second network entity associated with one of the plurality of segments of the virtual local area network and the plurality of virtual volumes prevent another segment of another VLAN from communicating with the plurality of virtual volumes of the storage device;

wherein the user interface is operable to provide a user with information on mapping between the at least one file system and the plurality of segments of the virtual local area network (VLAN) and information on mapping between the at least one file system and the plurality of virtual volumes; and wherein at least one of the storage device and the user interface is operable to update the configuration information based on a request of the user mapping and un-mapping the plurality of segments of the VLAN to the at least one file system and update the configuration information based on the request of the user mapping and um-mapping the plurality of volumes to the at least one file system.

21. A method of controlling accesses from servers to a network storage subsystem, wherein the network storage subsystem is connected to a virtual local area network (VLAN) switch via a VLAN switch and receives access requests from the servers via the VLAN switch, the method comprising the steps of:

allocating a plurality of dedicated storage resources for storing user data provided over a network to at least one network entity to each of a plurality of VLAN segments, receiving a Internet Protocol (IP) packet based access from a server, determining a VLAN segment of the plurality of VLAN segments that the server belongs to, based on a VLAN identification in the IP packet, and permitting the server to access the plurality of dedicated storage resources allocated to a at least one file system, the at least one file system being used by a computer different from the network storage subsystem to store data in the network storage subsystem, each file system being managed by each of a plurality of file server modules, associated with the VLAN segment that the server belongs to, and preventing another server that does not belong to the plurality of VLAN segments from accessing the plurality of dedicated storage resources based on configuration information managed by the network storage subsystem, the configuration information comprising information on at least one file system, information on mapping of the plurality of VLAN segments to the at least one file system and information on mapping of the plurality of dedicated storage resources to the at least one file system, wherein the determining, permitting and preventing are performed by the network storage subsystem;

providing a user with information on mapping between the at least one file system and at least one of the first virtual local area network and the second virtual local area network and information on mapping between the at least one file system and the plurality of virtual volumes;

updating the configuration information based on a request of the user mapping and un-mapping the at least one of the first virtual local area network and the second virtual local area network to the at least one file system; and updating the configuration information based on the request of the user mapping and un-mapping the plurality of volumes to the at least one file system.

22. A method, comprising:

separating a virtual LAN into a plurality of segments;

managing a mapping of each one of the plurality of segments to at least one file system, the at least one file system being used by a computer different from a storage system to store data in the storage system, each file system being managed by each of a plurality of file server modules, and mapping of a plurality of storage devices operable to provide storage resources for storing user data over a network to at least one network entity to the file system;

assigning a plurality of virtual volumes to the file system and assigning a plurality of segments to the file system;

controlling access to the plurality of virtual volumes, such that the plurality of virtual volumes will communicate only with the plurality of segments within the same group file system; wherein the managing and controlling is performed by the storage device, providing a user with information on mapping between the at least one file system and at least one of the plurality of segments and information on mapping between the at least one file system and the plurality of virtual volumes;

updating the configuration information based on a request of the user mapping and un-mapping the at least one of the plurality of segments to the at least one file system; and updating the configuration information based on the request of the user mapping and un-mapping the plurality of volumes to the at least one file system.

23. The storage apparatus of claim 1, wherein the file system comprises a file.

24. The method of claim 10, wherein the file system comprises a file.

25. The computer program product of claim 15, wherein the file system comprises a file.

26. The network storage apparatus of claim 18, wherein the file system comprises a file.

27. The storage apparatus of claim 19, wherein the file system comprises a file.

28. The system claim 20, wherein the file system comprises a file.

29. The method of claim 21, wherein the file system comprises a file.

30. The method of claim 22, wherein the file system comprises a file.

* * * * *